United States Patent [19]

Mihm, Jr.

[11] Patent Number: 5,402,490
[45] Date of Patent: Mar. 28, 1995

[54] PROCESS FOR IMPROVING PUBLIC KEY AUTHENTICATION

[75] Inventor: Thomas J. Mihm, Jr., Mesa, Ariz.

[73] Assignee: Motorola, Inc., Schaumburg, Ill.

[21] Appl. No.: 937,772

[22] Filed: Sep. 1, 1992

[51] Int. Cl.6 .............................................. H04L 9/08
[52] U.S. Cl. ....................................... 380/21; 380/25; 380/30
[58] Field of Search ............................ 380/21, 23-25, 380/30, 52; 340/825.34

[56] References Cited

U.S. PATENT DOCUMENTS

| | | | |
|---|---|---|---|
| 3,665,162 | 5/1972 | Yamamoto et al. | 380/23 |
| 4,423,287 | 12/1983 | Zeidler | 380/23 |
| 4,438,824 | 3/1984 | Mueller-Schloer | 380/25 |
| 4,691,350 | 9/1987 | Kleijne et al. | 380/52 |
| 4,956,863 | 9/1990 | Goss | 380/30 |
| 5,012,514 | 4/1991 | Renton | 380/52 |
| 5,029,207 | 7/1991 | Gammie | 380/23 |
| 5,033,084 | 7/1991 | Beecher | 380/25 |
| 5,036,461 | 7/1991 | Elliot et al. | 340/825.34 |
| 5,077,790 | 12/1991 | D'Amico et al. | 380/23 |
| 5,093,860 | 3/1992 | Steinbrenner et al. | 380/52 |
| 5,161,189 | 11/1992 | Bray et al. | 380/21 |
| 5,185,795 | 2/1993 | Bright | 380/25 |
| 5,189,700 | 2/1993 | Blandford | 380/23 |

Primary Examiner—Salvatore Cangialosi
Attorney, Agent, or Firm—Robert M. Handy; Gregory J. Gorrie

[57] ABSTRACT

An environment which includes a communications network, user terminals, and an authentication center provides communication services only to legitimate subscribers. The authentication center receives an equipment ID for each terminal, generates a series of sequence numbers and uses a secret key to encrypt the sequence numbers and the equipment ID with a user ID and an error detection code to form an encrypted block. This block is programmed into an authentication module and sent to the subscriber for installation in the subscriber's terminal. The authentication center sends a public key to network authentication nodes. When the subscriber operates the terminal to gain access to the network, a log-on message, which includes the encrypted block and an unencrypted version of the equipment ID, is sent to an authentication node. The node decrypts the encrypted block and evaluates the IDs and sequence number to determine whether to grant access to services.

32 Claims, 8 Drawing Sheets

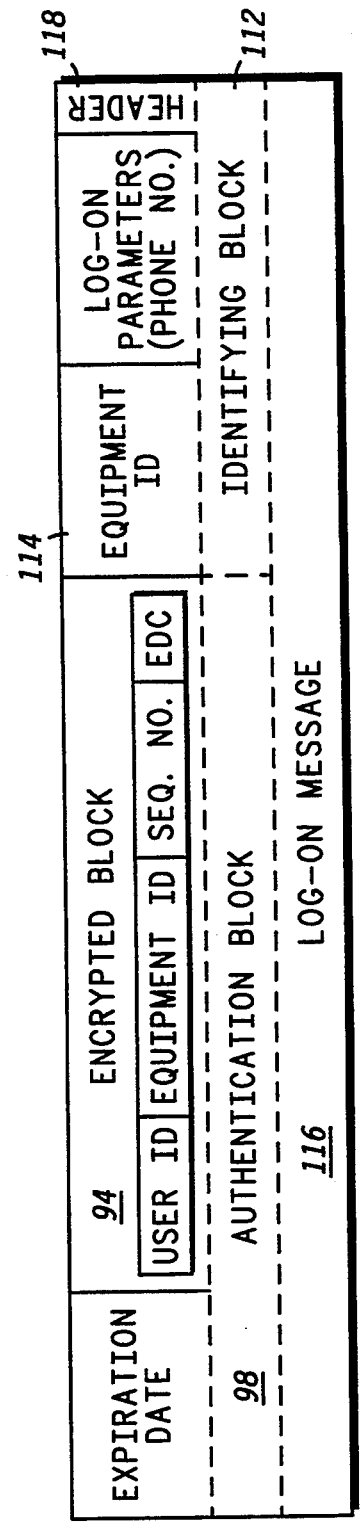

PROCESS FOR IMPROVING PUBLIC KEY AUTHENTICATION

United States Patent application entitled "Authentication System" with Ser. No. 795,606, filed Nov. 21, 1991, now U.S. Pat. No. 5,249,230, by the same inventors related.

FIELD OF THE INVENTION

The present invention relates generally to the provision of services. More specifically, the present invention relates to systems and methods for insuring that services are provided only to legitimate users of the service.

BACKGROUND OF THE INVENTION

Communication services, whether land-line telecommunication, cellular telecommunication, or other radio-communication services, are offered through the use of automated equipment. Computing services, database services, and various financial services are other examples of automated services. These and other automated services are offered to subscribers by service providers. Typically, subscribers utilize such services through user equipment, and service providers establish and maintain infrastructures which cooperate with the user equipment to provide resources to the subscribers.

The providers of automated services often need to insure that their services are being provided only to legitimate subscribers. When the resources are valuable, such as when communication is involved, piracy of the services can deprive the service provider of revenues, waste scarce resources on users not entitled to receive the resources, reduce availability of resources for legitimate subscribers, and generally increase costs for legitimate subscribers. In other situations, such as in connection with database and financial services, the offered resources are of a sensitive nature wherein serious damage can result from unauthorized tampering.

In order to insure that only legitimate subscribers use available resources, service providers often employ systems to authenticate the users. In accordance with one authenticating system, the service provider supplies both the infrastructure equipment and all the user equipment. The service provider may design the various parts of this equipment to cooperate with one another in accordance with proprietary design parameters. While this system may be effective with a small number of users, legal and economic factors cause it to fail as the number of users increases to mass market proportions. As the number of users grows, additional equipment suppliers desire to serve the marketplace, the design parameters tend to become widely known, and "pirate" equipment tends to appear. Unauthorized users can then gain access to the service through the use of pirate equipment.

Other systems cause the users to take particular actions to gain access to the service. For example, computer and database resources often require users to supply passwords before access to the service is granted. Financial services often require users to supply personal identification numbers (PINs) before access is granted. However, such passwords and PINs are not effective in authenticating users. When passwords and PINs are configured so that they can be easily remembered, they are easily discovered by potential pirates. When passwords and PINs are more complex, legitimate subscribers tend to write them down where they become vulnerable to pirates.

Other systems require legitimate users to carry devices which include complex and occasionally encrypted codes that serve to identify the users. Such devices are often used with PINs to protect against theft of the device. When the devices include encrypted codes, the service providers typically provide elaborate key management procedures making the service more burdensome and driving up the costs for all legitimate users. Furthermore, requiring users to carry devices to access a service is an unwanted burden in many situations.

SUMMARY OF THE INVENTION

Accordingly, it is an advantage of the present invention that an improved system for authenticating users of a service is provided.

Another advantage is that the present invention effectively authenticates users without requiring a service provider to control user equipment.

Another advantage of the present invention is that users are effectively authenticated without placing a burden on legitimate users of the service.

Another advantage of the present invention is that users are effectively authenticated at minimal cost. Yet another advantage is that the present invention provides services on a priority basis.

The above and other advantages of the present invention are carried out in one form by a method for authenticating users of a service offered by a service provider. The service is accessible through user terminals that have equipment identification data (ID) associated therewith. The equipment ID for one of the user terminals is obtained. An encrypted block of data, which includes the equipment ID and sequence numbers, is then formed. The encrypted block of data is stored in the user terminal, and the user terminal sends a log-on message to the service provider. The log-on message includes the encrypted block and the equipment ID.

The above and other advantages of the present invention are carried out in another form by a method for authenticating user's of a service which is accessible through user terminals that have equipment identification data (ID) and sequence numbers associated therewith. A log-on message is received. The log-on message includes one of a sequence of encrypted blocks of data and an identifying block of data. The encrypted block includes a first equipment ID in an encrypted form and a sequence number. The identifying block includes a second equipment ID. The encrypted block is decrypted to obtain the first equipment ID and sequence number. The sequence number in the encrypted block is compared with the sequence number received in the previous log-on message. Access to the system is denied if the sequence number is equal to or less than the previous one. The first and second equipment IDs are evaluated to detect correspondence therebetween. Access to the service is denied if a correspondence is not detected.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 7 shows a block diagram of a user database memory structure utilized by the authentication center in accordance with the present invention;

FIG. 8 shows a block diagram of a log-on message utilized by the present invention;

DESCRIPTION OF THE PREFERRED EMBODIMENT

Figure 1:
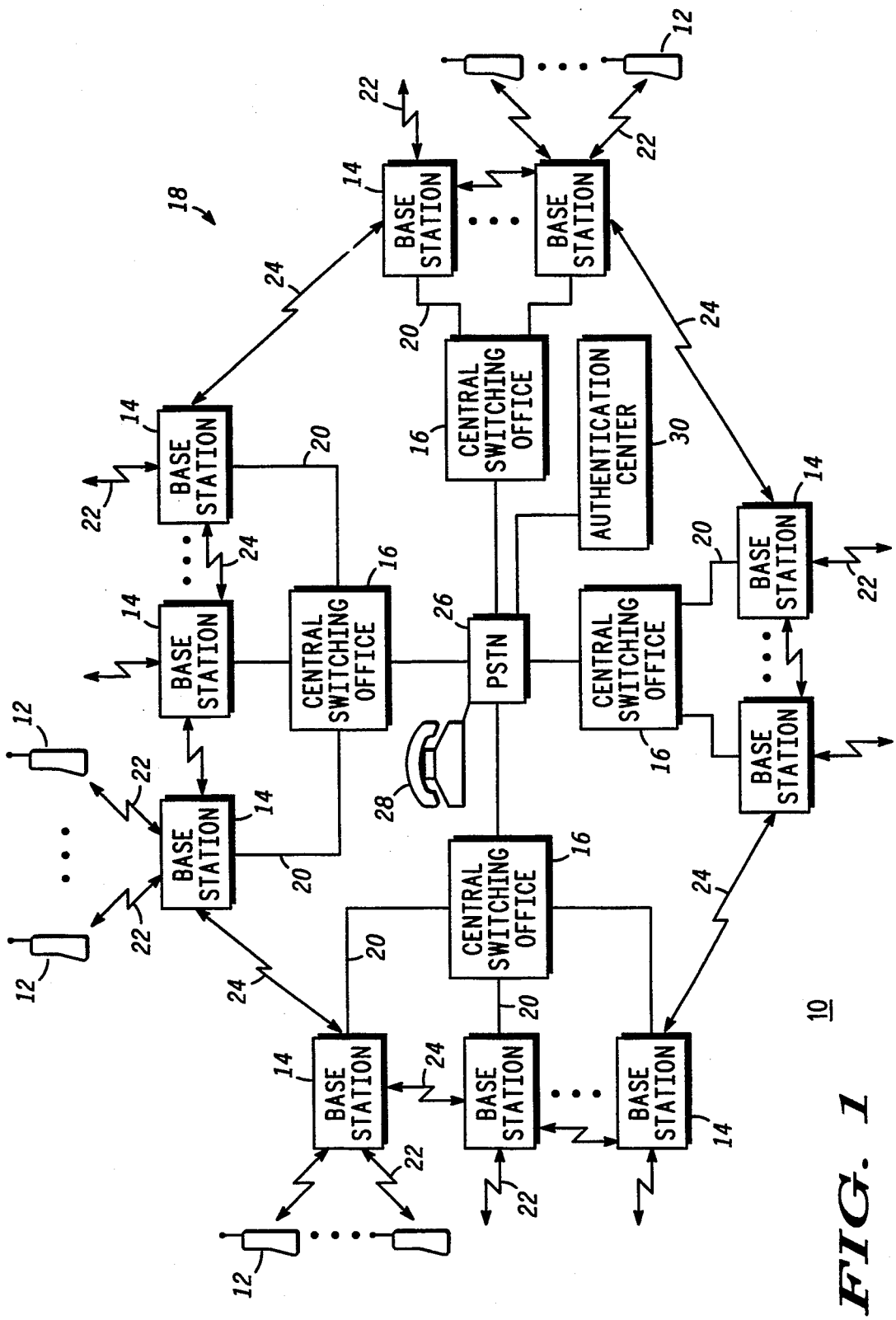
FIG. 1 shows a block diagram of a communications environment wherein a preferred embodiment of the present invention is practiced.

FIG. 1 shows a block diagram of a communications environment 10 within which the preferred embodiment of the present invention is practiced. Environment 10 includes any number of user terminals 12, base stations 14, and central switching offices 16. Base stations 14 and central switching offices 16 serve as nodes of a communications network 18. Network 18 provides communication services or resources to subscribers through user terminals 12.

In the preferred embodiment, central switching offices 16 are dispersed throughout a wide geographical area. Each central switching office 16 controls its own set of base stations 14 through dedicated communication links 20. Links 20 may be implemented using radio-communication for base stations 14 which are mobile, such as on aircraft, ships, or vehicles, and/or not terrestrially based, such as orbiting satellites. On the other hand, links 20 may be implemented using land-lines for base stations 14 which are stationary and/or terrestrially based. In the preferred embodiment, base stations 14 communicate over radio frequency (RF) links 22 with the user terminals 12 that are located nearby. In addition, base stations 14 communicate with neighboring base stations 14 over links 24, which may be implemented using RF or landlines. Any user terminal 12 or node of network 18 may communicate through network 18 with other user terminals 12 and with other nodes of network 18.

In the preferred embodiment, central switching offices 16 of network 18 couple to the public switched telecommunications network (PSTN) 26. This gives additional routes for communication between nodes of network 18 and permits any user terminal 12 to communicate with any of the multitude of telephone instruments and devices 28 coupled to PSTN 26.

Environment 10 additionally includes an authentication center 30. Authentication center 30 is in data communication with network 18 and all nodes thereof. This data communication may occur through PSTN 26, as shown in FIG. 1, or through a direct link to any node of network 18 (not shown). While authentication center 30 may be positioned anywhere, it is preferably placed at a permanent location where security measures may be effectively employed at low expense. Due to a desire to maintain inexpensive but effective security, the use of only one authentication center 30 within environment 10 is preferred.

Figure 2:
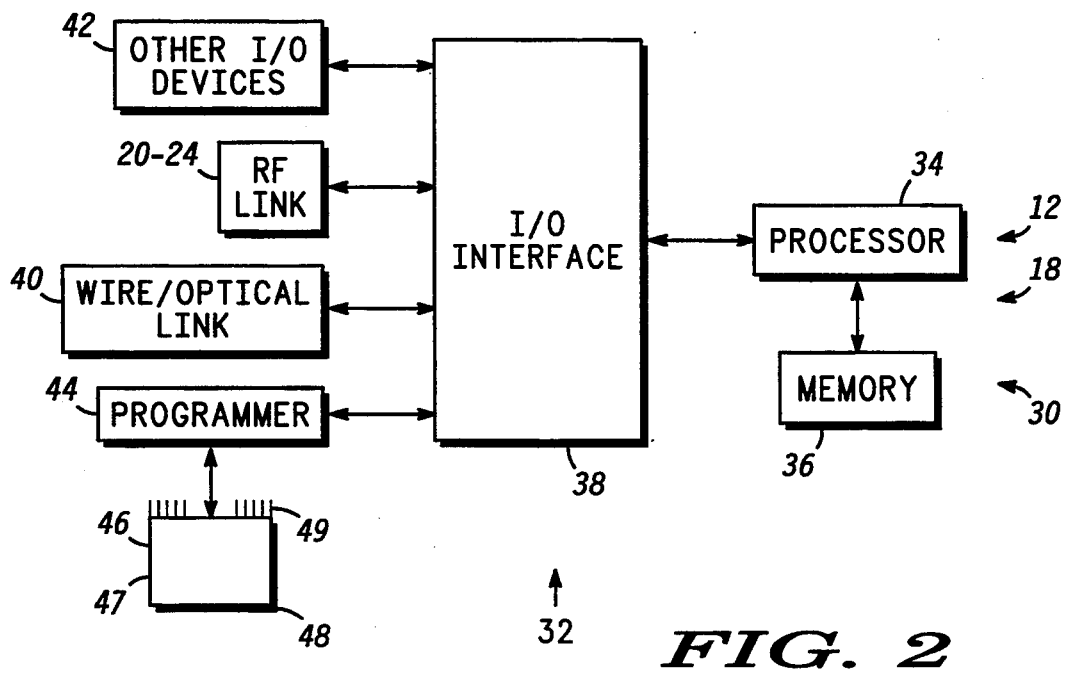
FIG. 2 shows a block diagram which describes various components utilized by the present invention.

FIG. 2 shows a hardware block diagram which, with minor variations, applies to authentication center 30, to each user terminal 12, and to each node of network 18. Generally speaking, each of authentication center 30, terminals 12, and the nodes of network 18 represents a computer 32. Terminals 12 and the nodes of network 18 represent computers which are dedicated to their respective communication functions and which include additional features not related to the present authentication system. Authentication center 30 is, for example, a general purpose, personal computer.

Computer 32 includes a processor 34 which couples to a memory 36 and an input/output (I/O) interface 38. Memory 36 stores data. Some of this data is stored permanently and other data is stored temporarily. The data include computer programs which instruct computer 32 how to perform the procedures that are discussed below in more detail. Processor 34 communicates data through I/O interface 38. For user terminals 12 and nodes of network 18, interface 38 couples to a link which may be an RF link, such as links 20–24, discussed above in connection with FIG. 1. For certain nodes of network 18 and for authentication center 30, I/O interface 38 couples to a land-line wire or optical link 40, through which data may be communicated as discussed above in connection with FIG. 1. In addition, I/O interface 38 couples to other conventional I/O devices 42. Devices 42 include a wide range of data input devices, such as keyboards, keypads, pointing devices, and the like, and a wide range of data output devices, such as displays, printers, and the like.

For authentication center 30, I/O interface 38 also couples to a conventional programmer 44. Programmer 44 is used for programming authentication block data (discussed below) into an authentication module (AM) 46. Preferably, AM 46 contains a programmable read only memory (PROM) 47 mounted in a small housing 48 having connectors 49 adapted for mating with programmer 44 and with a user terminal 12. The programming of each AM 46 is customized for its own user terminal 12.

Figure 3:
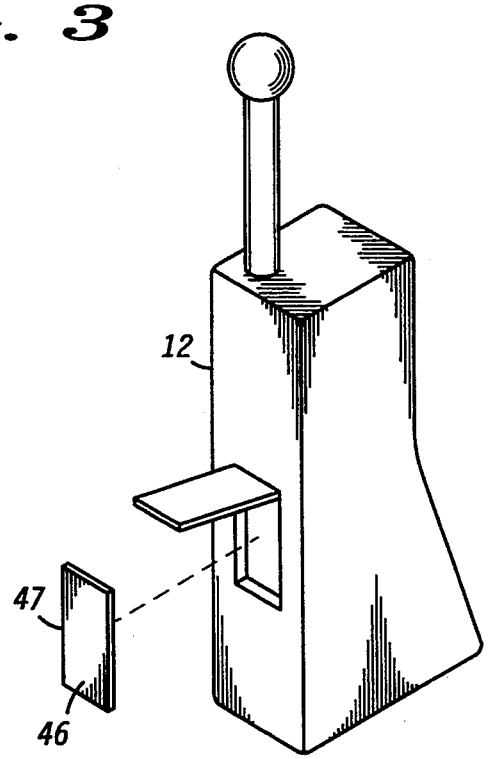
FIG. 3 shows cooperation between a user terminal and an authentication module in accordance with the present invention.

As shown in FIG. 3, the physical characteristics of housing 47 of AM 46 are designed in cooperation with user terminal 12 so that AM 46, including memory 47 therein, is removably inserted within user terminal 12. Moreover, each AM 46 is combined with its terminal 12 so that connectors 49 (see FIG. 2) mate with corresponding connectors (not shown) within the terminal 12 and so that memory 47 of AM 46 then serves as a portion of memory 36 (see FIG. 2) for the terminal 12.

Alternatively, AM 46 contains digital circuitry (not shown) that performs addressing of PROM 47. Thus, terminal 12 has no control over the addressing of the information in AM 46 and only requests information from AM 46. The digital circuitry addresses PROM 47 in a predetermined manner and transfers the resultant data to terminal 12. The digital circuitry is configured such that the next request for information will point to the next desired address. The configuration may result in sequentially addressing the PROM (i.e. a sequential binary up counter) or may contain an unusual count sequence such that some numbers are not used.

In the preferred embodiment of the present invention, authentication center 30 programs or otherwise produces AMs 46 in an inexpensive manner. Compared to the overall cost of a user terminal 12, the cost of AM 46 is negligible. Thus, the service provider may maintain control of the services through the use of AMs 46, without needing to control the manufacture or distribution of terminals 12. Moreover, design data related to terminals 12 may become widely known without compromising authentication system security. Furthermore, due to the small size and low cost of AMs 46, they may be conveniently produced remotely from terminals 12 and then transported to their associated terminals 12. This remote production allows a high degree of security to be inexpensively maintained at one or a few centers 30 when compared to attempting to maintain security at numerous widely dispersed locations. Details related to the use of AMs 46 in environment 10 (see FIG. 1) are provided below.

Figure 4:
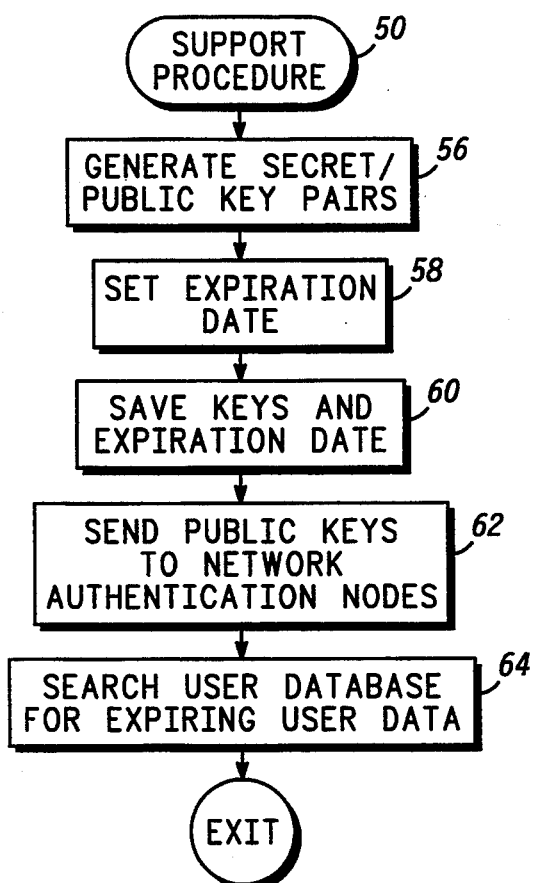
FIGS. 4–6 show flow charts of procedures performed at an authentication center in accordance with the present invention.
Figure 5:
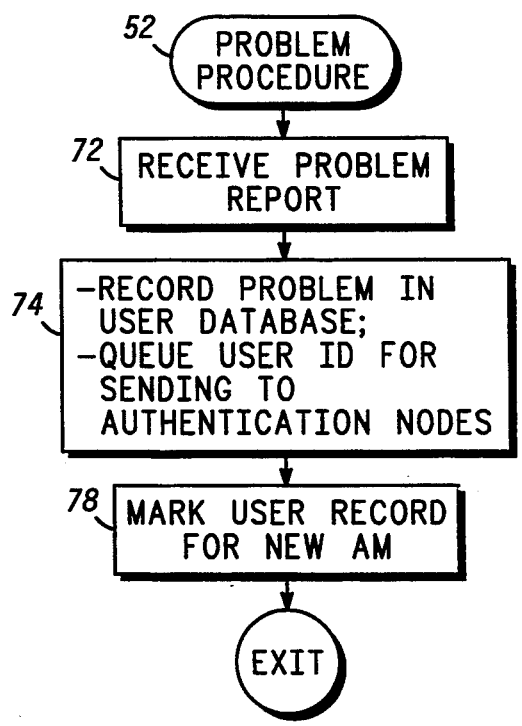
Figure 6:
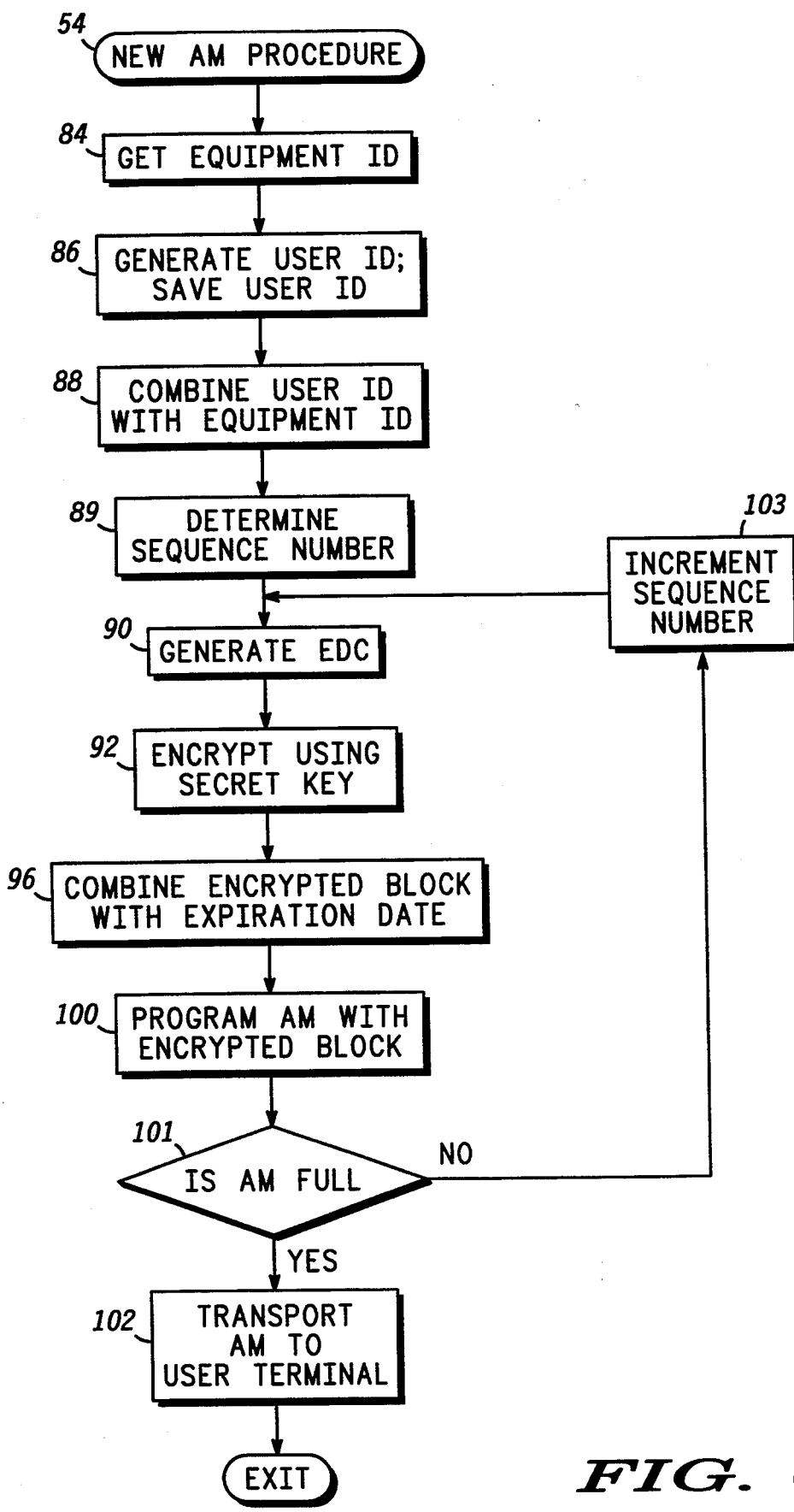

FIGS. 4-6 show flow charts of procedures performed at authentication center 30. In particular, FIG. 4 depicts a support procedure 50, FIG. 5 depicts a problem procedure 52, and FIG. 6 depicts a new AM procedure 54.

With reference to FIG. 4, support procedure 50 is performed from time to time on a regular schedule, preferably yearly. Through the operation of procedure 50 in combination with procedure 54, subscribers' AMs 46 are refreshed or replaced with new AMs 46. In a task 56, authentication center 30 generates a complementary pair of encryption keys. The pair generated in task 56 is considered to be the current pair of keys. These keys are preferably in the form of digital data. In the preferred embodiment, task 56 forms the keys in accordance with conventional asymmetric, secret/public key encryption processes, such as the RSA process. Preferably, a relatively large modulus, such as around 512 bits, is used to virtually guarantee that the code cannot be broken. One secret key is used in producing each AM 46. AMs 46 are replaced from time to time using different secret keys to limit damage which might occur and to limit rewards which might be realized when a potential pirate becomes aware of a secret key.

A task 58 sets an expiration date for use with the key pair generated in task 56. Preferably, this date is set to indicate that the key pair will remain valid for at least a year. Network 18 recognizes AMs 46 so long as the key pairs used in their production remain valid. A task 60 saves the key pair and expiration date in memory 36 (see FIG. 2) for authentication center 30, and a task 62 sends the public key from the key pair to all authentication nodes of network 18 (see FIG. 1).

The public key is sent to network 18 in the clear. In other words, no unusual precautions are taken to insure that the public key remains unknown to potential pirates, and no expensive or complex key management system is employed to distribute the public keys. Rather, the public keys are distributed through PSTN 26 and network 18 using normal data communication techniques. On the other hand, the secret key is kept secure at authentication center 30. Since environment 10 (see FIG. 1) needs to include only one authentication center 30, the expense of maintaining effective security is relatively low.

The authentication nodes of network 18 are those nodes where authentication procedures, discussed below, are performed. Such procedures are preferably performed in a distributed manner at remote nodes of network 18. In other words, each base station 14 or central switching office 16 (see FIG. 1) preferably performs authentication procedures with respect to requests for service which are routed therethrough. By performing such authentication procedures remotely, overall network resources are conserved when compared to performing authentication procedures performed at a central location since fewer communication links within network 18 are utilized to dispose of requests for services. Preferably, either base stations 14 or central switching offices 16 may serve as the authentication nodes.

In support procedure 50, a task 64 is performed to identify subscribers or legitimate users of network 18 whose AMs 46 (see FIGS. 2-3) are soon to expire. Task 64 may be performed by searching a user database 66, an exemplary block diagram of which is shown in FIG. 7. With reference to FIG. 7, user database 66 includes a record 68 for each subscriber. Each record 68 includes a field 70 that identifies the key pair that is associated with each subscriber's AM 46. Field 70 need not identify secret keys. As discussed above, the keys are associated with an expiration date. Thus, by searching field 70, users whose AMs 46 are soon to expire are identified. Task 64 then queues such records so that new AMs 46 may be produced therefor through the operation of procedure 54 (FIG. 6). The new AMs 46 will be formed using different encryption keys than were used in forming their predecessors. Each record also desirably includes field 71 that reports the value of the sequence number of the first information block stored in AM 46. If the use of PIN is desired, the PIN value is stored in user database 66.

Referring to FIG. 5, authentication center 30 performs procedure 52 whenever it receives a report of a problem with the service. The reported problems relate to a loss or theft of a user terminal 12 or an associated AM 46. Subscribers are encouraged to report such problems because failure to do so may cause them to be responsible for service charges rendered through their terminals 12. In addition, the service providers may report problems when a legitimate subscriber has canceled his or her service subscription or has refused to pay bills. Furthermore, the service provider may report a problem when a subscriber changes the nature of the service to which he or she is subscribing. When such changes require new AMs 46, then the existence of the old AMs 46 can pose a problem.

Procedure 52 performs a task 72 to receive a problem report. A task 74 may advantageously log the problem in user database 66 (see FIG. 7) for statistical purposes. In addition, task 74 queues user identifying data (ID) 76 (see FIG. 7) from user database 66 for sending to the authentication nodes of network 18. Later, preferably in off-peak communication traffic periods, this user ID 76 will be sent to all authentication nodes of network 18. Procedure 52 also performs an optional task 78, which marks or otherwise queues the production of a new AM 46 for the user. Task 78 is performed whenever the reported problem warrants. For example, if a user has lost an AM 46 but still possesses the user terminal 12, the production of a new AM 46 is warranted.

Authentication center 30 performs procedure 54 whenever new AMs 46 are needed (see FIG. 6). A new AM 46 may be needed when a problem, such as loss of an AM 46, is reported to authentication center 30. In addition, a new AM 46 is needed when a subscriber's old AM 46 is about to expire, as determined in accordance with task 64 (see FIG. 4). Subscribers need to do nothing to cause new AMs 46 to be produced when their old AMs 46 are about to expire. Authentication center 30 automatically produces the needed AMs 46 and sends them to the subscribers before the old AMs 46 actually expire.

Furthermore, a new AM 46 is needed when a new subscriber subscribes to the service. In the new subscriber situation, identifying data is collected and stored in user database 66 (see FIG. 7). The identifying data include subscriber identifiers 80 (see FIG. 7). Identifiers 80 describe the subscriber by name, address, credit information, phone numbers, and other data deemed useful to the service provider. In addition, this identifying data includes equipment identifying data (ID) 82 (see FIG. 7). Equipment ID 82 is preferably, but not necessarily, a unique identifying number which is associated with each user terminal 12. This identifying data may be supplied by the subscriber through paper forms sent to authentication center 30 or through electronic communications.

Authentication center 30 performs a task 84 to retrieve equipment ID 82 from database 66 (see FIG. 7) for a particular subscriber. A task 86 generates an appropriate user ID 76 for the subscriber and saves the user ID 76 in database 66. In the preferred embodiment, user ID 76 is a unique number. It is not assigned to another subscriber. Moreover, user ID 76 may be coded to indicate a priority to be associated with the subscriber. Thus, subscribers may pay extra for a high priority service which will be more readily available in times of heavy communication traffic. In addition, governmental emergency service providers may be assigned high priority user IDs 76 so that communications will be assured in times of emergency. User IDs 76 are generated for new subscribers and for old subscribers in response to certain problem reports. However, task 86 may be omitted when an existing subscriber's old AM 46 is about to expire and no problem has been indicated.

After task 86, a task 88 combines the user ID with the related equipment ID in a predetermined manner. In the preferred embodiment, the user ID and equipment ID are simply concatenated together. Authentication center 30 performs task 89 to assign an initial sequence number 71 to each user and places it in database 66. Sequence number 71 may be assigned any value but in the preferred embodiment is set to one "1" when a new key is replacing an expired key. If there is a need to perform procedure 54 to produce a new AM 46 due to a problem report before the expiration of the key, then the sequence number can be set to some intermediate value. This intermediate value must be greater than the last value in the previous AM 46 transported to the user. Task 89 determines this intermediate value by retrieving the number of information blocks from data base 66 contained in field No. blocks 73, incrementing it by at least one and adding this value to sequence number 71. Task 89 also initializes the count 75 in data base 66 by setting it equal to zero. Along with user identifying data from data base 66, task 74 of procedure 52 (FIG. 5) sends the initial sequence number 71, initial count 75 and number of blocks (No. Blocks) 73 to the authentication nodes.

Once task 89 determines the initial sequence number it appends it to the concatenated user ID, equipment ID string and updates the Seq No. 71 field in data base 66. This initial sequence number is sent to all authentication nodes in task 74. It will be used for comparison of the first call made with the AM 46 being programmed.

Next, task 90 generates an error detection code (EDC) for the combined user ID, equipment ID, and sequence number. Conventional parity, checksum, or cyclic redundancy check (CRC) codes are used, for example, as the EDC.

After task 90, a task 92 encrypts the combined user ID, equipment ID, sequence number, and EDC using the current key, discussed above in connection with task 56 (see FIG. 4). If support procedure 50 (see FIG. 4) is performed on a yearly basis, then a secret key remains current for a year. Task 92 preferably uses a conventional algorithm, such as the RSA algorithm, to encrypt this data, but other encryption methods may also be used. After encryption, this data form an encrypted block 94, which is illustrated in the block diagram of FIG. 8.

Those skilled in the art will appreciate that secret keys in an asymmetric encryption system are typically viewed as being used to decrypt data. Thus, some may interpret the action performed in task 92 as being that of a decryption rather than an encryption. Nevertheless, for purposes of the present invention, task 92 is considered to encrypt data because the data are being covered or otherwise altered from their original and meaningful form. In other words, as will be discussed below, a complementary step of decryption is performed to return the data to its original and meaningful form so that the data may be used for further processing. Moreover, in accordance with the present invention, it is entirely possible that a pirate may discover a public key and may use the public key to decrypt an encrypted block 94 to discover its contents. However, the present invention is directed toward authentication, not secrecy. So long as the secret key remains secret, knowledge about the contents of encrypted block 94 or about the public key will not help a potential pirate successfully generate a pirate AM 46.

After task 92, a task 96 combines encrypted block 94 with the current key's expiration date, previously generated and saved in tasks 58–60 (see FIG. 4). This expiration date together with encrypted block 94 forms an authentication block 98, which is also illustrated in FIG. 8. After task 96, a task 100 programs the newly formed authentication block 98 into a blank AM 46. As discussed above in connection with FIG. 2, this programming takes place through the control of programmer 44.

In the preferred embodiment, task 100 maintains a memory pointer so that a series of authentication blocks are programmed into contiguous memory location of AM 46 one at a time. This memory pointer will be initialized to the first memory location reserved for the first authentication block and will be advanced as needed by task 100 as each additional authentication block is programmed.

Next, query task 101 checks to see if all of the desired authentication blocks 98 (see FIG. 8) have been programmed into AM 46. The number of authentication blocks 98 that an AM 46 may hold is limited only by the size of the memory device. In the preferred embodiment, a PROM with 64K or 128K bytes of memory can hold as many as 900 to 1800 authentication blocks when a 512 bit modulus is used in the secret key. If the number of authentication blocks already programmed in AM 46 is less than the number of blocks required, task 103 advances the sequence number by one and initiates the creation of the next authentication block. Task 103 appends the new sequence number to the original concatenated user ID, equipment ID string and continues with tasks 90 through 100. When the number of authentication blocks programmed in AM 46 is equal to the required number of blocks 73 in user database 66 (FIG. 7), AM 46 programming loop exits to task 102.

After programming AM 46, AM 46 is transported to the user terminal 12 with which it is to be combined, as indicated in a task 102. Due to the small size of AM 46, postal services may be utilized for transporting AM 46 to its terminal 12 at little expense. Appropriate mailing and packaging labels may be printed during task 102 in support of transporting AM 46 to its destination.

Figure 9:
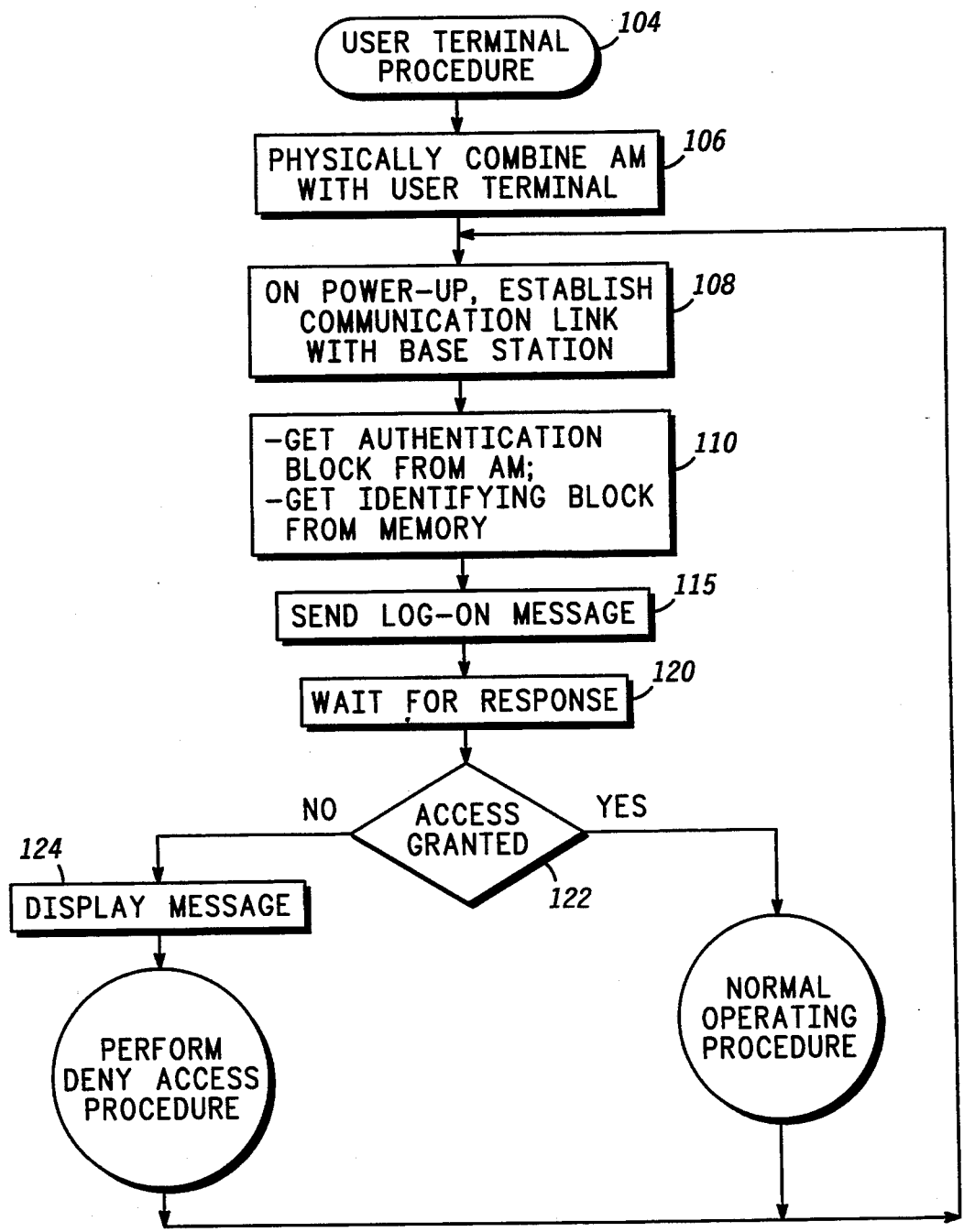
FIG. 9 shows a flow chart of a procedure performed at user terminals in accordance with the present invention.

FIG. 9 shows a flow chart of a user terminal procedure 104, which is performed at each user terminal 12. Procedure 104 is performed in order for terminal 12 to gain access to the services offered by network 18 (see FIG. 1). However, nothing about the nature of procedure 104 needs to be kept secret to maintain security of the authentication system of the present invention. As a result, the control of authentication is divested from the manufacture, control, and distribution of terminals 12.

As indicated at a task 106, the AM 46 which was transported above in task 102 (see FIG. 6) is combined with terminal 12, preferably through a simple plugging-in operation which resembles the installation of a battery (see FIG. 3). Once combined, AM 46 need not be removed until a new AM 46 is received just prior to the expiration of an old AM 46. While physical insertion of AM 46 into terminal 12 is preferred, it may also be physically combined thru use of a cable or other conventional communication link provided for that purpose. It may also be embodied in a credit card like device.

Whenever user terminal 12 is energized, a task 108 establishes a communication link with a nearby base station 14 (see FIG. 1). Task 108 performs the synchronizing operations needed to allow data communications to take place between terminal 12 and network 18 over a link 22 (see FIG. 1). Next, a task 110 gets authentication block 98 (see FIG. 8) from its memory 36 (see FIG. 2). As discussed above, AM 46 is now a portion of memory 36 for its terminal 12. It is this portion of memory 36 that is accessed in task 110 to obtain authentication block 98.

Each authentication block 98 in AM 46 can only be used once. Furthermore the sequence number in the encrypted block 94 must increase in value with each subsequent retrieval by task 110. Therefor, task 110 maintains a memory address pointer to the next encryption block in the sequence ( i.e. sequence number greater than one). This pointer is initialized to the location of the first authentication block when AM 46 is combined with terminal 12 in task 106. The pointer is advanced by one each time an authentication block 98 is retrieved. In addition task 110 stores the current value of the pointer in some nonvolatile way after each advancement.

With the option described previously that requires AM 46 to contain a simple digital circuit that addresses the PROM, the terminal 12 does not need to maintain an address pointer of its own. The value of the address pointer is never accessible external to AM 46. In addition, the simple digital circuit can be deactivated upon removal of AM 46 from the terminal by automatically resetting the PROM address to zero. This renders AM 46 unusable to a would-be thief since the value of the PROM address pointer before deactivation is unknown and after deactivation it points to a previously used block.

As task 110 proceeds it gets an identifying block 112 from portions of its memory 36. Identifying block 112 is illustrated in the block diagram of FIG. 8. Preferably, identifying block 112 is programmed into memory 36 during the manufacture or sale of terminal 12. As shown in FIG. 8, identifying block 112 includes two types of data. One type of data is the terminal's equipment ID 114 and the other type of data represents other log-on parameters. Equipment ID 114 is the same equipment ID value that has been communicated to authentication center 30 and used in forming authentication block 98. The other log-on parameters include the phone number for the terminal 12 and any other data which network 18 requires before granting access to offered services.

Referring to FIG. 9, after task 110, a task 115 forms and sends a log-on message 116 (FIG. 8) over the link 22 (see FIG. 1) established above in task 108. Message 116 includes the current authentication block 98, identifying block 112, and a header 118. Header 118 identifies the message as a log-on message. After task 115, terminal 12 waits at a task 120 until a response is received from network 18. This response is evaluated in a query task 122. If the response indicates that access is granted, terminal 12 continues with its normal operating procedures. These normal operating procedures handle communications through terminal 12 and network 18. The normal operating procedures are continued until terminal 12 is de-energized or link 22 is otherwise broken.

On the other hand, if the response indicates that access is denied, a task 124 displays an appropriate "Deny Access" message on a display of terminal 12. After displaying this message, terminal 12 may then perform a deny access procedure. The deny access procedure may, for example, de-energize terminal 12 and prevent re-energization for a predetermined period of time. Alternatively, various instructions may be displayed or connections to a customer service representative may be initiated so that the user can discuss the problem with a human operator.

Figures 10, 12:
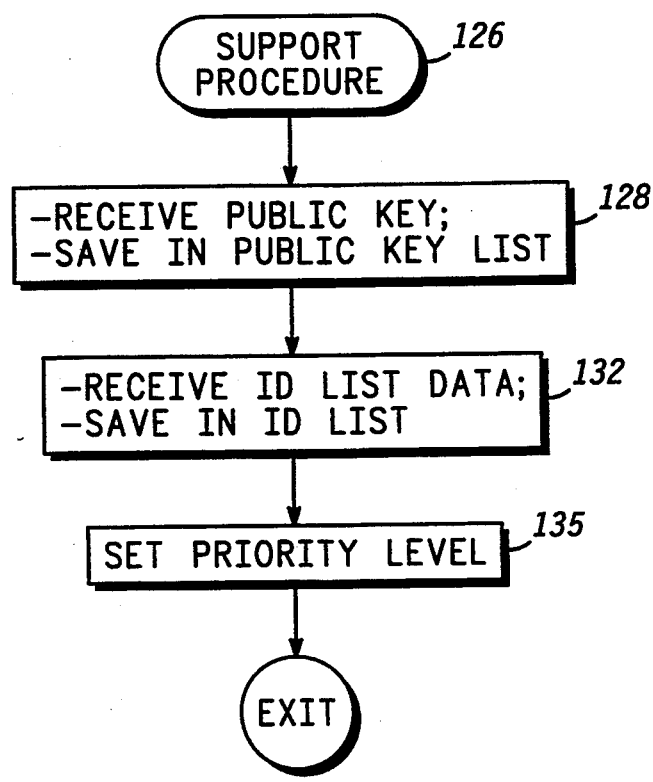
FIGS. 10–11 show flow charts of procedures performed at an authentication node in accordance with the present invention.
FIG. 12 shows a block diagram of a public key list memory structure utilized by the authentication node in accordance with the present invention.
Figure 11:
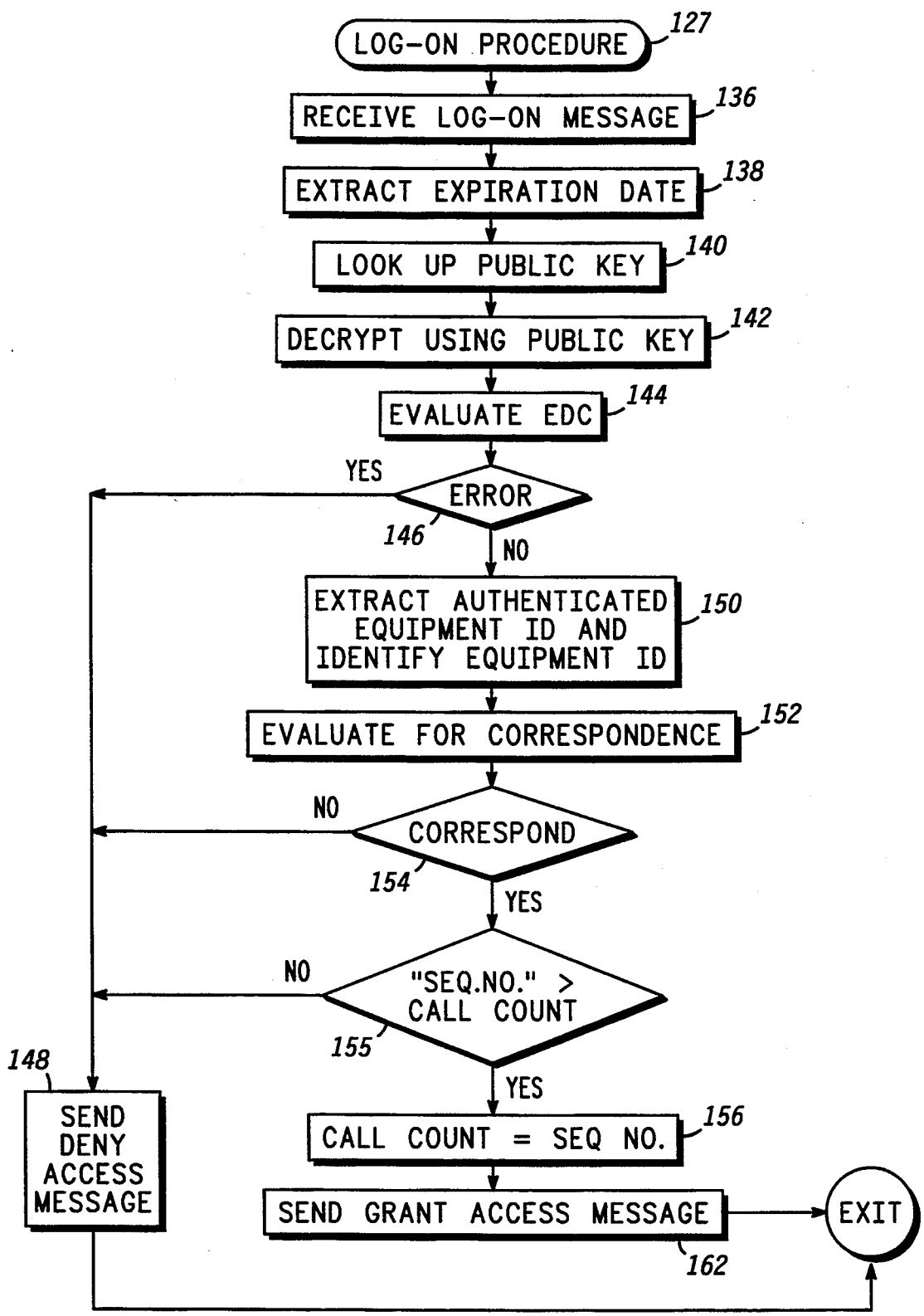

FIGS. 10–11 show flow charts of procedures performed at the authentication nodes of network 18. As discussed above, the authentication nodes perform authentication procedures. In particular, they evaluate and respond to log-on messages (e.g., log on message 116, FIG. 8) sent by user terminals 12. If base stations 14 serve as authentication nodes, then the log-on messages need not be passed on to central switching offices 16 (see FIG. 1). If central switching offices 16 serve as authentication nodes, then base stations 14 simply pass the log-on messages on to their associated central switching offices 16.

FIG. 10 shows a flow chart of a support procedure 126. Procedure 126 is performed to obtain and maintain data which are used in a log-on procedure 127, described below in connection with FIG. 11. In particular, a task 128 is performed when a message is received that carries a new public key. Such messages result from the performance of task 62 (see FIG. 4) by authentication center 30 (see FIG. 1). Task 128 saves the public key in the memory 36 of the authentication node.

This public key is saved in a public key list 130, which is illustrated in the block diagram of FIG. 12. As shown in FIG. 12, the public key message additionally includes the expiration date which is associated with the public key, as discussed above in tasks 58–62 (see FIG. 4). This expiration date is also saved in list 130. Public key list 130 may include any number of public keys and associated expiration dates. However, when new key pairs are generated periodically for environment 10 and each key pair is set to expire on an annual basis, list 130 includes, typically, around 12-14 records. This low number of records consumes a minimal amount of memory, even when duplicated at all the authentication nodes in network 18 and helps in keeping the expense and complexity of the authentication system of the present invention low.

A task 132 is performed when a message is received that carries a record from the user data base 66 (see FIG. 7). Such messages result from the performance of task 74 (FIG. 5) by authentication center 30. In the preferred embodiment of the present invention a user data base 66, similar to the one at authentication center 30, is maintained at the authentication node. User data base 66 stored at the authentication node contains records only for those users that are clients of the node, recipients of a service. These client users may be local or visitors. Local user client records are sent directly to the authentication node from authentication center 30 by task 74 (see FIG. 5). Visitor user client records are retrieved from the authentication node to which they are local user clients on an as needed basis. Each authentication node maintains a user database 66 in a current form by receiving messages from time to time.

FIG. 11 shows a flow chart of procedure 127, which is performed by an authentication node when a log-on message 116 (see FIG. 8) is received from a user terminal 12. With reference to FIGS. 8 and 11, message 116 is received during a task 136. The expiration date is extracted in a task 138, and a task 140 uses this expiration date to perform, for example, a table look-up operation. The look-up operation utilizes public key list 130 (see FIG. 12) to select the public key that is associated with the received expiration date. Of course, if an invalid expiration date is retrieved an appropriate message may be returned to user terminal 12 (not shown). Once this public key has been selected, a task 142 decrypts encrypted block 94 from message 116. The preferred embodiment utilizes a conventional decryption process, for example, such as the RSA process. This decryption returns the data included in encrypted block 94 to its original and useful form.

After task 142, a task 144 evaluates the EDC portion of block 94, now decrypted. As is conventional, task 144 processes the user ID and equipment ID from block 94 to detect some correspondence between that data and the EDC. Well know parity, checksum, and CRC processes, for example, are contemplated at task 144. A query task 146 switches program control in response to this evaluation. A lack of such correspondence indicates that an error has occurred. In this situation, an error signifies that encrypted block 94 has not decrypted correctly. Incorrect decryption is one indicator of tampering with AM 46 (see FIGS. 2-3). It is also an indicator of a potential pirate trying to gain access to network 18 by transmitting "guesses" about acceptable encrypted blocks 94. When an error is indicated, a task 148 constructs and sends the "Deny Access" message back to user terminal 12. No further resources of network 18 are wasted on dealing with the request for service presented by message 116. User terminal 12 will act upon the "Deny Access" message as discussed above in connection with task 124 (see FIG. 9).

On the other hand, if task 146 determines that block 94 decrypted correctly, a task 150 extracts the authentication equipment ID from block 94 and the identifying equipment ID from block 112. A task 152 evaluates these two equipment ID values for some sort of correspondence. In the preferred embodiment of the present invention, these two values are simply compared for equality. However, those skilled in the art will appreciate that additional processing of one or more of these two values may take place to determine if the two values are related to one another in a predetermined manner. A query task 154 switches program control in response to this evaluation. A lack of correspondence indicates that an AM 46 does not match the user terminal 12 with which it is being used. When task 154 detects a lack of correspondence, task 148 is performed to deny access. Thus, a potential pirate does not profit by stealing an AM 46 for use in another user terminal 12 or by copying an AM 46 for use in another terminal 12.

If task 154 determines that the two values correspond, then task 155 evaluates the sequence number portion of block 94 (see FIG. 8). For every new log-on message 116 the authentication node receives from a particular terminal 12, the sequence number portion of block 94 must be greater than every sequence number contained in every previous log-on messages from the same terminal 12. Task 155 checks to see if this is true by comparing the sequence number portion of block 94 with the call count 75 field of the user data base 66 (FIG. 7). The call count 75 is initialized when the authentication nodes receives a message from the authentication center through support procedure 126 during task 132 (see FIG. 10). When the sequence number is less than or equal to call count 75, task 155 switches program control to task 148. A "Deny Access" message is sent and no further resources of network 18 are used to process this log-on message. When the sequence number is greater than the call count 75, task 156 replaces the value in the call count 75 in the user data base 66 with the value in the sequence number portion of block 94 and passes control to task 162 which constructs and sends an "Access Granted" message to terminal 12. At this point authentication is complete and the authentication node continues with other operations. The user terminal 12 will process the Access Granted message as discussed above in connection with FIG. 9. The user will be able to utilize the services and resources offered by network 18.

In summary, the present invention provides an improved system and method for authenticating, to a high level of confidence, users of a service. The high level of confidence is achieved, at least in part, by the use encrypted authentication blocks which are refreshed at regular intervals. In accordance with the present invention, the service provider is not required to control the manufacture, distribution, or use of user terminals. Rather, security is maintained through the production of inexpensive authentication modules. Moreover, in accordance with the present invention, legitimate service subscribers are not burdened by authentication procedures or systems. Once authentication modules are installed in user terminals, the terminals are available for use without the user needing to take further action with respect to authentication.

Furthermore, the cost of authentication in accordance with the present invention is minimal. The authentication modules are inexpensive. Procedures performed at user terminals and authentication nodes require little processing power or computer memory. The only security precautions which are needed in accordance with the present invention are taken at the authentication center. The authentication center may be practiced, for example, in a conventional personal computer, and only one authentication center is required for the entire environment within which the present invention is practiced. The use of continually advancing sequence numbers in conjunction with authenticating with a public key algorithm provides strong security against pirating services without costly key management procedures. In place of costly secure key management procedures inexpensive nonvolatile memory technology is used to allow for "disposable" authentication codes. The sequence numbers provide security because the authentication codes are only used once. Memory technology provides a way to store enough authentication codes so that disposability is possible. The public key like algorithm allows for distribution of decryption keys to authentication nodes over non secure communication links. It also prevents the altering of "disposed" authentication codes to make them valid codes.

The present invention has been described above with reference to a preferred embodiment. However, those skilled in the art will recognize that changes and modifications may be made in this preferred embodiment without departing from the scope of the present invention. For example, those skilled in the art may devise a similar system which does not use user IDs but which encrypts each equipment ID with its own unique encryption key.

In addition, while the above described authentication system and method functions without a user PIN, use of a PIN is not precluded. For example, a PIN unique to each user may be assigned to or entered by the user and included in Log on message 116 in plain or encrypted form and verified in much the same manner as has already been described in connection with FIGS. 4–12. However, such PIN number is not essential.

These and other changes and modifications which are obvious to those skilled in the art are intended to be included within the scope of the present invention.

What is claimed is:

1. A method for authenticating, by an authentication center having a first processor contained therein, user terminals used by users of a communication service offered by a communication service provider, said communication service being accessible through at least one user terminal of said user terminals, said one user terminal including a second processor contained therein, said user terminal having equipment identification data (ID) associated therewith and having pre-encrypted messages including sequence numbers stored therein, said method comprising steps of:
   (a) obtaining by said first processor, said equipment ID for said one user terminal;
   (b) obtaining by said first processor, said sequence numbers for said one user terminal;
   (c) forming at said authentication center by said first processor, an encrypted block, said encrypted block including said equipment ID and said sequence numbers;
   (d) storing said encrypted block in said one user terminal, said pre-encrypted messages comprising said encrypted block; and
   (e) receiving a log-on message from said one user terminal to said communication service provider at least at initiation of a communication session, said log-on message including one of said pre-encrypted messages and said equipment ID.

2. A method as claimed in claim 1 wherein said step (c) comprises the steps of:
   (c1) combining said equipment ID associated with said one user terminal with said sequence number to form a combined block, said sequence number being from a list of numbers in a particular order;
   (c2) encrypting said combined block to form said encrypted block; and
   (c3) repeating said steps (c1) and (c2) for each of said sequence numbers of said list of numbers to form a list of encrypted blocks which comprise said pre-encrypted messages, and said step (d) additionally comprises the step of storing said pre-encrypted messages in said one user terminal, and said step (e) additionally comprises the step of receiving a log-on
   message including one of said pre-encrypted messages stored in said one user terminal.

3. A method as claimed in claim 1 wherein said step (c) comprises a step of including first user identification data (ID) in said encrypted block.

4. A method as claimed in claim 1 wherein:
   said step (c) includes a step of using a secret key in forming said encrypted block; and
   said method additionally comprises a step of sending a public key to said communication service provider, said public key complementing said secret key.

5. A method as claimed in claim 1 wherein:
   said step (c) includes a step of generating expiration date data for association with said encrypted block;
   said step (d) includes a step of storing said expiration date data in said one user terminal; and
   said log-on message includes said expiration date data with said pre-encrypted message and said equipment ID.

6. A method as claimed in claim 1 wherein:
   said step (c) includes a step of programming an authentication module to store said encrypted block; and
   said step (d) comprises a step of physically combining said authentication module with said one user terminal.

7. A method as claimed in claim 6 wherein said step (c) is performed at a location remote to said one user terminal, and said method additionally comprises a step of transporting said authentication module from said remote location to said one user terminal.

8. A method as claimed in claim 1 wherein said step (c) uses an encryption key to form said encrypted block, and said method additionally comprises steps of repeating said step (c) and said step (d) for said one user terminal from time-to-time, wherein different encryption keys are used during different repetitions of said step (c).

9. A method for authenticating user terminals used by users of a communication service accessible through said user terminals, wherein said user terminals have pre-encrypted messages stored therein, said pre-encrypted messages including sequence numbers and equipment identification data (ID) associated with said user terminals, said method comprising steps of:
   (a) receiving from one of said user terminals, a log-on message at initiation of each calling session, said log-on message including an encrypted block and an identifying block, said encrypted block being one of said pre-encrypted messages and including a first equipment ID in an encrypted form and one of said Sequence numbers in an encrypted form, said identifying block including a second equipment ID in a non-encrypted form;

(b) decrypting at a communication service provider, said encrypted block by a first processor to obtain said first equipment ID and said sequence number;

(c) evaluating by said first processor, said first and second equipment IDs to detect correspondence therebetween;

(d) evaluating by said first processor, said sequence number with a previously used sequence number to detect a correspondence therebetween; and (e) denying access to said communication service when said step (c) fails to detect said correspondence or said step (d) detects said correspondence.

10. A method as claimed in claim 9 wherein:

said encrypted block additionally includes an error detection code;

said step (b) additionally obtains said error detection code;

said steps (c) and (d) additionally evaluate said error detection code to determine when an error is indicated; and said step (e) denies access to said communication service when said step (c) or said step (d) determines that said error is indicated.

11. A method as claimed in claim 9 wherein:

said encrypted block additionally includes first user identification data (ID);

said step (b) additionally obtains said first user ID;

said method additionally comprises the step of maintaining a list of second user IDs;

said step (c) additionally evaluates said first user ID and said list of second user IDs to determine whether said first user ID is included in said list of second user IDs; and said step (d) additionally determines whether to grant access to said communication service in response to said evaluation of said list of second user IDs with respect to said first user ID.

12. A method as claimed in claim 11 wherein said list of second user IDs serves as an unauthorized user list, and said step (d) denies access to said communication service when said first user ID is included in said list of second user IDs.

13. A method as claimed in claim 9 wherein:

said first equipment ID is encrypted using a secret key;

said method additionally comprises step of receiving a public key from a remote location, said public key complementing said secret key; and said step (b) utilizes said public key in decrypting said encrypted block by said first processor.

14. A method as claimed in claim 13 wherein:

said communication service is a communication service provided through a network having a plurality of central switching offices in data communication with one another, each of said central switching offices in communication with its own plurality of base stations; and said method additionally comprises steps of: providing an authentication center in data communication with said central switching offices and said base stations, generating said complementing secret and public keys at said authentication center, forming said encryption block at said authentication center, and sending said public key from said authentication center to at least one of said central switching offices and said base stations.

15. A method as claimed in claim 9 wherein said log-on message additionally includes expiration date data, and said method additionally comprises steps of:

saving first and second decryption keys in a memory contained in said authentication station; and selecting, in response to said expiration date data, one of said first and second decryption keys for use in said step (b).

16. A method as claimed in claim 9 wherein:

said communication service is provided through a network having a plurality of central switching offices, each of said central switching offices in communication with its own plurality of base stations; and said steps (b), (c), (d) and (e) are performed at said base stations of said network.

17. A method as claimed in claim 9 wherein:

said communication service is provided through a network having a plurality of central switching offices, each of said central switching offices in communication with its own plurality of base stations; and said steps (b), (c), (d) and (e) are performed at said central switching offices.

18. A system for providing communication services only to authenticated user terminals for use by users through a communication network having a plurality of nodes, said communication services being provided through said user terminals having pre-encrypted messages stored therein, said pre-encrypted messages including sequence numbers and equipment identification data (ID) associated with said user terminals, said system comprising:

one or more authentication modules, each authentication module for combining with a corresponding one of said user terminals; and means, responsive to said equipment IDs, for producing said authentication modules, each of said authentication modules for storing an encrypted block of data therein, said encrypted block of data including said equipment ID in an encrypted form and a series of said sequence numbers in an encrypted form, said sequence numbers comprising a list of numbers in a particular order.

19. A system as claimed in claim 18 wherein said producing means is in data communication with said communication network, said producing means for generating complementary encryption and decryption keys, said encryption keys being used in forming said encrypted blocks and said decryption keys being transmitted to said network.

20. A system as claimed in claim 19, at least some of said network nodes for:

receiving said decryption keys and receiving log-on messages, wherein each message includes one of said authentication module encrypted blocks and one of said user terminal equipment IDs;

decrypting said encrypted blocks using said decryption keys;

evaluating whether said equipment IDs from said encrypted blocks corresponds to said equipment IDs from said user terminals;

evaluating whether said sequence number from said encrypted blocks corresponds to said sequence number from said network nodes; and granting access to said communication services based on said evaluation.

21. A system as claimed in claim 20 wherein:

said producing means for providing said encrypted blocks additionally provides user identification data (ID);

said at least some network nodes each include memory means for storing a list of user IDs; and said at least some network nodes evaluate said user IDs from said encrypted blocks with said list of user IDs in determining whether to grant access to said communication services.

22. A method for authenticating user terminals for use by users using a communication service provided by a communication network in communication with an authentication center, said communication network accessible through said user terminals having pre-encrypted messages stored therein, said pre-encrypted messages including sequence numbers and equipment identification data (ID) associated therewith, said sequence numbers comprising a list of numbers in a particular order, said method comprising steps of:

(a) obtaining said equipment ID and said sequence numbers for one of said user terminals by a first processor;

(b) forming an encrypted block, said encrypted block including said equipment ID and said sequence numbers;

(c) storing said encrypted block in a memory in said one user terminal;

(d) sending a log-on message from said one user terminal to said communication network at initiation of each calling session, said log-on message including said encrypted block and said equipment ID;

(e) decrypting said encrypted block portion of said log-on message by said first processor to obtain an authentication equipment ID;

(f) evaluating said authentication equipment ID by said first processor to detect correspondence between said authentication equipment ID and said equipment ID;

(g) evaluating said sequence number by said first processor to determine if said sequence number is subsequent to previous sequence numbers used; and (h) denying said communication services to said one user terminal when said step (f) fails to detect said correspondence or said step (g) determines said sequence number is not subsequent to previous sequence numbers used.

23. A method as claimed in claim 22 wherein:

said step (b) further comprises a step of including an error detection code in said encrypted block;

said step (e) additionally includes a step of decrypting said encrypted block portion of said log-on message to obtain said error detection code;

said step (f) additionally includes a step of evaluating said error detection code to determine when an error is indicated;

said step (g) additionally includes a step of evaluating said error detection code to determine when an error is indicated; and said step (h) denies access to said communication service when said step (f) or (g) determines that said error is indicated.

24. A method as claimed in claim 23 wherein:

said step (b) additionally includes a step of forming an encrypted block, said encrypted block including first user identification data (ID);

said step (e) additionally includes a step of obtaining said first user ID;

said method additionally comprises a step of storing a list of second user IDs in a memory coupled to said first processor;

said step (f) additionally includes a step of evaluating said first user ID and said list of second user IDs to determine whether said first user ID is included in said list of second user IDs; and said step (h) denies access to said communication service when said step (f) determines that said first user ID is included in said list of second user IDs.

25. A method as claimed in claim 22 wherein:

said step (b) includes step of programming an authentication module to retain said encrypted block; and said step (c) comprises a step of physically combining said authentication module with said one user terminal.

26. A method as claimed in claim 22 wherein:

said network has a plurality of central switching offices in data communication with one another, each of said central switching offices being associated with its own plurality of base stations; and said method additionally comprises steps of:

generating complementing secret and public keys at said authentication center;

using, in said step (b), said secret key at said authentication center to form said encrypted block; and sending said public key from said authentication center to at least one of said central switching offices and said base stations.

27. A system for providing communication services only to authenticated users, said system comprising:

a user terminal having equipment identification data (EID) stored therein; and a removable user authentication module having sequence numbers and said EID stored therein in a pre-encrypted form, said sequence numbers comprising a list of numbers in a particular order, wherein said user terminal is adapted to receive said removable user authentication module.

28. An apparatus for authenticating a user terminal for use by a user to a system which provides communication services through said user terminal having pre-encrypted messages stored therein, said pre-encrypted messages including sequence numbers and equipment identification data associated therewith, said apparatus comprising:

a memory for storing said pre-encrypted messages, said pre-encrypted messages having a predetermined relationship to said equipment identification data, said predetermined relationship being expressed in accordance with an encryption key; and housing means coupled to said user terminal, said housing means for retaining said memory and to removably couple said memory to said user terminal.

29. An apparatus as claimed in claim 28 wherein said memory is further for storing an expiration date, said expiration date indicating when said encryption key becomes invalid.

30. An apparatus as claimed in claim 28 wherein:

said memory is further for storing user identification data and said pre-encrypted messages including said sequence numbers therein; and said user identification data and said equipment identification data are encrypted together at an authentication center in accordance with said predetermined encryption relationship.

31. An apparatus as claimed in claim 28 wherein:

said memory is further configured for storing an error detection code therein;

said error detection code and said equipment identification data are encrypted together in accordance with said predetermined encryption relationship; and said error detection code and said sequence numbers are encrypted together in accordance with said predetermined encryption relationship.

32. A method of accessing a communication system through a subscriber unit, said subscriber unit including an authentication module which includes blocks of pre-encrypted information, said pre-encrypted information including an equipment ID associated with said subscriber unit, each of said blocks including a sequence number, said blocks being encrypted at an authentication center and stored in said authentication module in an encrypted form, said method comprising the steps of:

sending, by said subscriber unit, said equipment ID and one of said blocks of said pre-encrypted information to a communication service provider when access is desired to said communication system; and receiving notice of access to said communication service from said service provider when said service provide detects correspondence between said equipment ID and a decrypted equipment ID, and determines that said sequence number is subsequent to a previous sequence number, said communication service provider decrypting said one of said blocks to determine said equipment ID and said sequence number.

* * * * *

UNITED STATES PATENT AND TRADEMARK OFFICE
CERTIFICATE OF CORRECTION

PATENT NO. : 5,402,490
DATED : March 28, 1995
INVENTOR(S) : Thomas J. Mihm, Jr.

It is certified that error appears in the above-indentified patent and that said Letters Patent is hereby corrected as shown below:

In column 14, line 14, insert a paragraph break between "and" and "said".

In column 14, line 16, insert a paragraph break between "and" and "said".

In column 14, line 18, delete a paragraph break between "log-on" and "message".

In column 14, line 60, replace "terminals-have" with --terminals have--.

In column 15, line 3, replace "Sequence" with --sequence--.

In column 15, line 51, insert --a-- between "comprises" and "step".

In column 18, line 18, insert --a-- between "includes" and "step".

Signed and Sealed this

Eighth Day of August, 1995

BRUCE LEHMAN

*Attest:*

*Attesting Officer*    *Commissioner of Patents and Trademarks*